(12) United States Patent
Tsai

(10) Patent No.: US 11,932,338 B2
(45) Date of Patent: Mar. 19, 2024

(54) BICYCLE SECURITY ALARM DEVICE

(71) Applicant: Ming-Ta Tsai, New Taipei (TW)

(72) Inventor: Ming-Ta Tsai, New Taipei (TW)

(73) Assignee: DAH KEN INDUSTRIAL CO., LTD., New Taipei (TW)

( * ) Notice: Subject to any disclaimer, the term of this patent is extended or adjusted under 35 U.S.C. 154(b) by 1 day.

(21) Appl. No.: 17/883,639

(22) Filed: Aug. 9, 2022

(65) Prior Publication Data

US 2024/0051630 A1 Feb. 15, 2024

(51) Int. Cl.
*B62H 5/20* (2006.01)
*B60R 25/10* (2013.01)

(52) U.S. Cl.
CPC ........... *B62H 5/20* (2013.01); *B60R 25/1006* (2013.01)

(58) Field of Classification Search
CPC ............................. B62H 5/20; B60R 25/1006

USPC ......................................................... 340/427
See application file for complete search history.

(56) References Cited

U.S. PATENT DOCUMENTS

| 2007/0188311 A1* | 8/2007 | Shin ......................... B62H 5/00 340/432 |
| 2013/0225088 A1* | 8/2013 | Anderson .............. H04B 17/30 343/894 |
| 2018/0080256 A1* | 3/2018 | Yang ....................... E05B 45/06 |
| 2023/0041669 A1* | 2/2023 | Zhang ..................... H04W 4/40 |

* cited by examiner

*Primary Examiner* — Kam Wan Ma

(57) ABSTRACT

A bicycle security alarm device is provided. The device includes a battery, a control chip, an alarm unit and a sensor mounted on a bicycle front fork. when a thief moves or rides a bicycle, the sensor detects the vibration of the bicycle and transmits a detection signal to the control chip. The control chip transmits an alarm signal to the alarm unit and operates the alarm unit. The alarm unit emits sound to attract the attention of people around.

7 Claims, 9 Drawing Sheets

BICYCLE SECURITY ALARM DEVICE

FIELD OF THE DISCLOSURE

The present disclosure relates to a security alarm device, and particularly to a security alarm device applied on a bicycle.

BACKGROUND OF THE DISCLOSURE

In addition to public transportation, the bicycle is a convenient and light choice for short-distance travel. However, compared with the locking and anti-theft mechanism of cars and scooters, the bicycle is relatively easier to become the target for theft. Especially those places with a high flow of people, such as metro stations, train stations, schools, libraries, parks, etc., are frequently stolen locations. It can only rely on locking the bike in an immovable rack, for example, the chain lock as disclosed in TWI634033B, and the lock as disclosed in TW202118923A.

High-priced bicycles are sports equipment for cyclists to go out for vacation and sports. Although most of the time the rider is with the bicycle, there will still be a short time that the bicycle cannot be carried with and not even within sight, for example, indoor dining, purchasing refills in a shop, and even going to the toilet. Forgetting to bring a lock or disliking carrying a lock due to the weight or inconvenient locking process usually provide opportunities for theft.

SUMMARY OF THE DISCLOSURE

The present disclosure is a bicycle security alarm device, which includes a battery, a control chip, an alarm unit and a sensor mounted on a bicycle front fork; wherein the battery is electrically connected to the control chip, the alarm unit and the sensor; wherein, the control chip is signally connected to the sensor and the alarm unit correspondingly; wherein, when the sensor detects vibration and transmits a detection signal to the control chip, and the control chip transmits an alarm signal to the alarm unit.

In practice, when a thief moves or rides the bicycle, the sensor detects the movement or vibration of the bicycle and transmits a detection signal to the control chip. The control chip transmits an alarm signal to the alarm unit and operates the alarm unit. The alarm unit emits sound to attract the attention of people around, so as to achieve the effect of an anti-theft warning. Moreover, the device of the present disclosure is mounted on the front fork of the bicycle, which is not a common additional lock type on a bicycle, so it has the effect of being hidden and difficult to be noticed by thieves.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Figure 1:
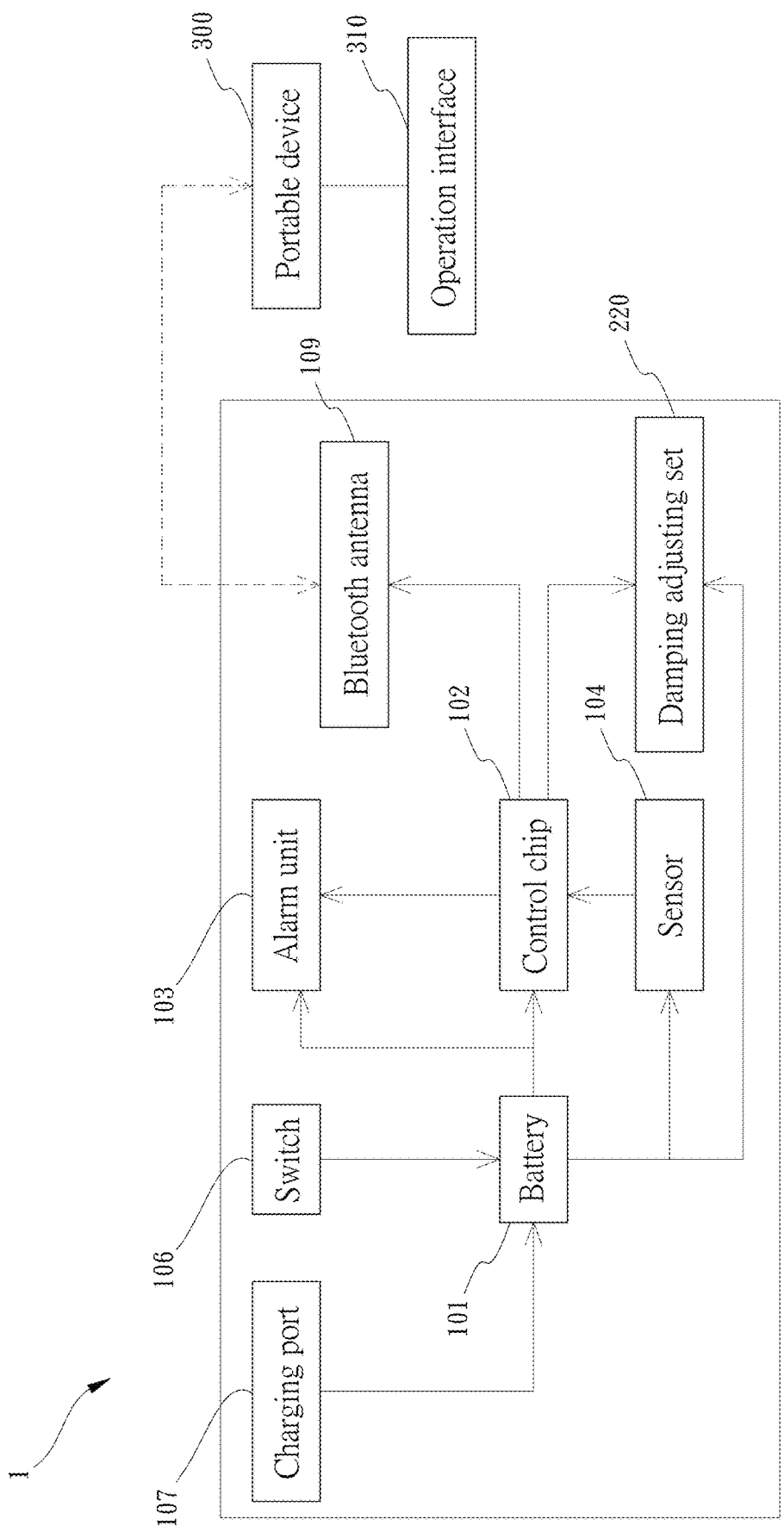
FIG. 1 is a block schematic diagram of the present disclosure.
Figure 2:
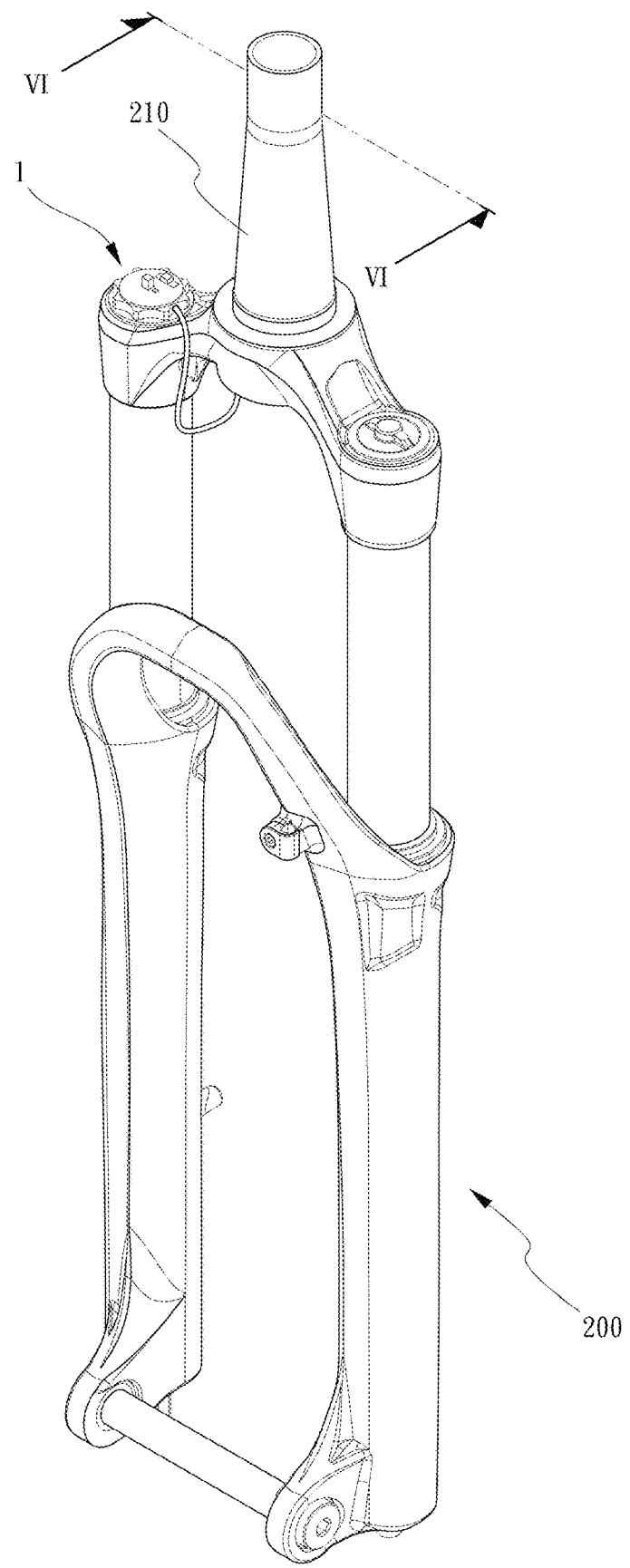
FIG. 2 is a schematic perspective view of the bicycle automatic shock absorbing device of the present disclosure applied to bicycle front fork.
Figure 3:
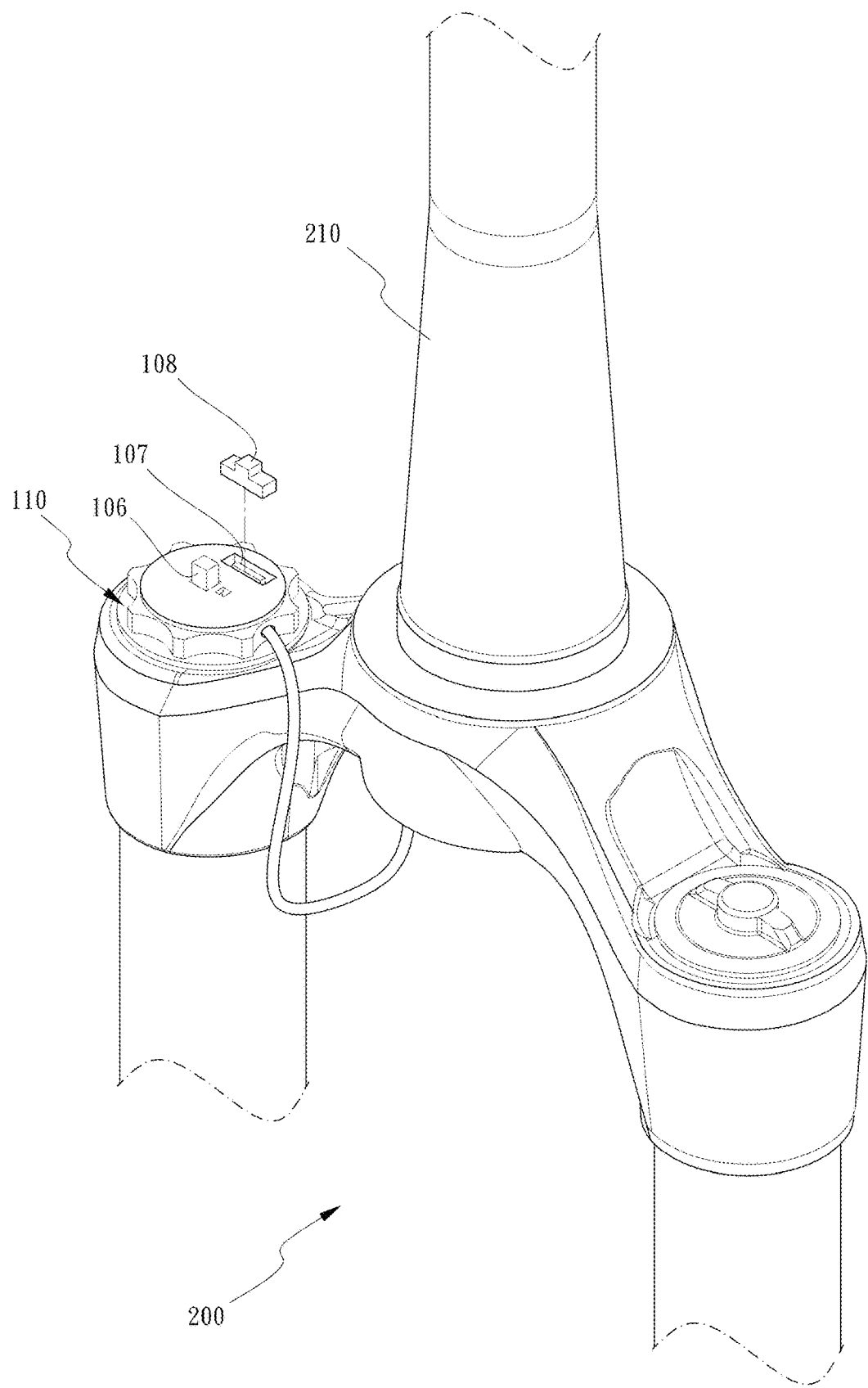
FIG. 3 is a partial enlarged schematic view of FIG. 2.

Referring to FIG. 1 to FIG. 4, a bicycle security alarm device is provided, which includes a battery 101, a control chip 102, an alarm unit 103 and a sensor 104 mounted on a bicycle front fork 200. The battery 101 is electrically connected to the control chip, the alarm unit and the sensor. The control chip 102 is signally connected to the sensor 104 and the alarm unit 103 correspondingly. Further, when the sensor 104 detects vibration and transmits a detection signal to the control chip 102, and the control chip 102 transmits an alarm signal to the alarm unit 103.

Figure 4:
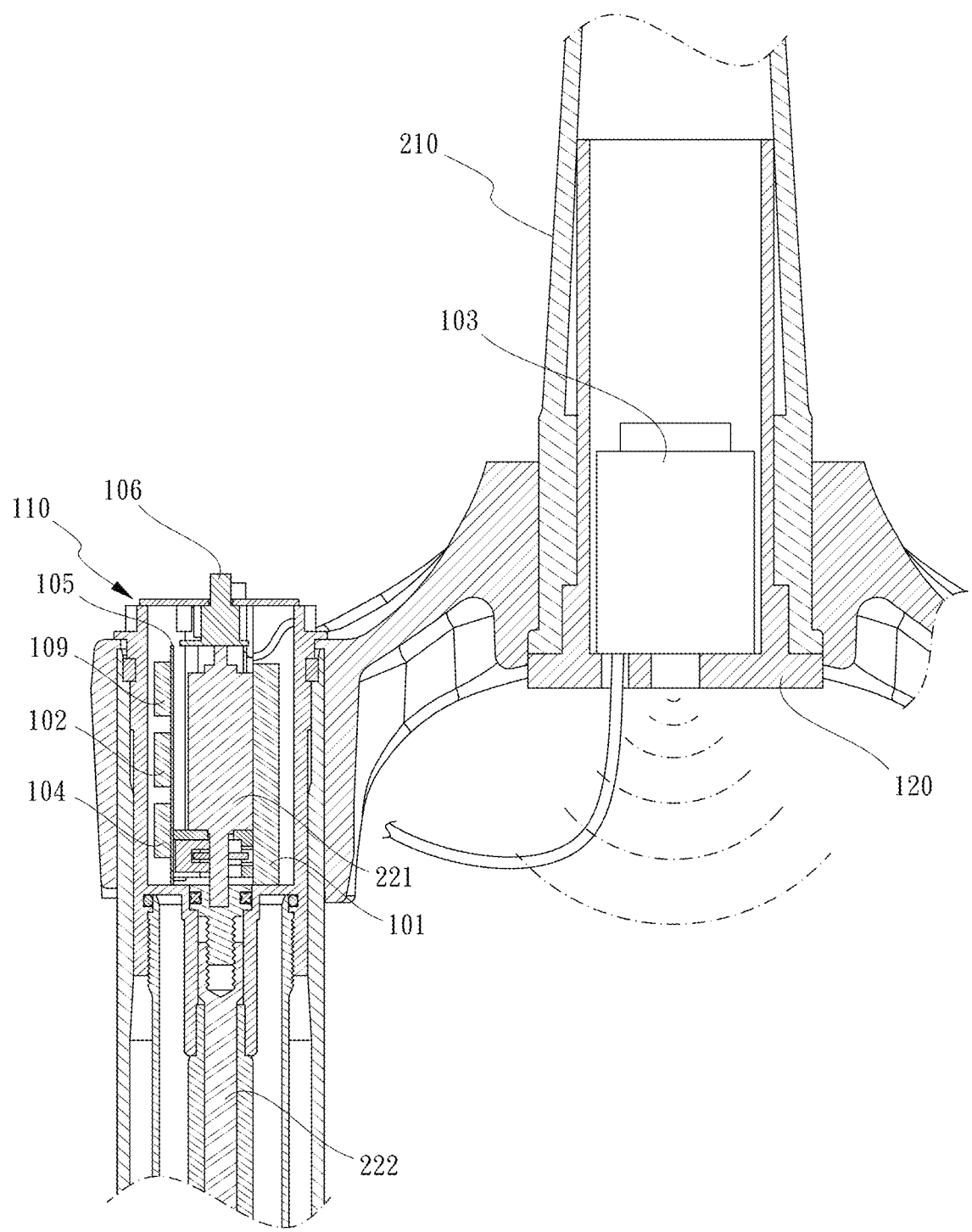
FIG. 4 is a partial sectional schematic view of FIG. 2.

In one embodiment, the battery 101, the control chip 102 and the sensor 104 are mounted on the inner side (left side as shown in FIG. 4) of the front fork through a cover, and the alarm unit is mounted on a hidden case 120 of a head tube in the front fork. Further, the alarm unit 103 is electrically connected to the control chip 102 and battery 101 through a wire set. Due to the bicycle will be equipped with brake lines or even front fork damping adjustment lines at the front fork 200, it is difficult for thieves to distinguish the difference between the wire set and other lines. Further, the cover 110 is equipped with a circuit board 105 for fixing the control chip 102 and the sensor 104, and the cover 110 is electrically connected to the battery 101, the alarm unit 103 and the sensor 104 through the circuit board.

The above-mentioned sensor 104 is an accelerometer, also known as an acceleration sensor, and a gravitational acceleration sensor. For example, the alarm unit 103 is a sounder, so that the operation of the alarm unit 103 is to emit sound. The hidden case 120 is generally in the form of a hollow barrel and is provided with an opening at the bottom. Through the opening, the wire set can be passed through, and the sound generated by the operation of the alarm unit 103 can be transmitted to the outside.

In practice, when a thief is moving or riding the bicycle, the sensor 104 detects the movement or vibration and transmits a detection signal to the control chip 102, and the control chip 102 transmits an alarm signal to the alarm unit 103. The sound of the alarm unit 103 attracts the attention of people around, so that the thief would be panic and usually flees the scene. Therefore, it prevents the bicycle from being stolen and achieves the anti-theft warning effect. In addition, the device of the present disclosure is mounted on the front fork 200 of the bicycle, which is not an ordinary additional lock type on a bicycle, so it has the effect of being hidden and difficult to be noticed by thieves.

The bicycle security alarm device 1 of the present disclosure further includes a switch 106 being electrically connected to the battery 101 for controlling the output of the battery 101 to the control chip 102, sensor 103 and the sensor 104. In order to facilitate the user to switch between the activation and deactivation of the bicycle security alarm device 1 of the present disclosure, that is, during regular riding or home storage, the switch 106 can be manually operated directly (herein, the switch 106 is a push button switch as an example) to turn the security alarm function on and off.

The bicycle security alarm device 1 of the present disclosure further includes a charging port 107 being electrically connected to the battery 101. The battery 101 is charged, when the connector that provides the external power supply is plugged into the charging port 107. The charging port 107 here is in the form of a USB connector as an example. The above-mentioned charging port 107 is partially fixed to the circuit board 105 and passes through the top position of the cover 110 and is partially exposed. In addition, a cap 108 can be put on the charging port 107 to prevent dust, sundries and water from entering the charging port 107 that affect charging.

The bicycle security alarm device 1 of the present disclosure further includes a Bluetooth antenna 109 electrically connected to the control chip 102. Further, a portable device 300 is connected to the control chip 102 by a duplex wireless signal via the Bluetooth antenna 109. Through the portable device 300, the alarm device can be switched between on and off by remote wireless operation, which provides the user with another option to operate the device. The Bluetooth antenna 109 is disposed at the position of the circuit board 105. The above-mentioned portable device 300 can be a smart phone, a laptop or a tablet, and herein it is a smart phone as an example.

Figure 5:
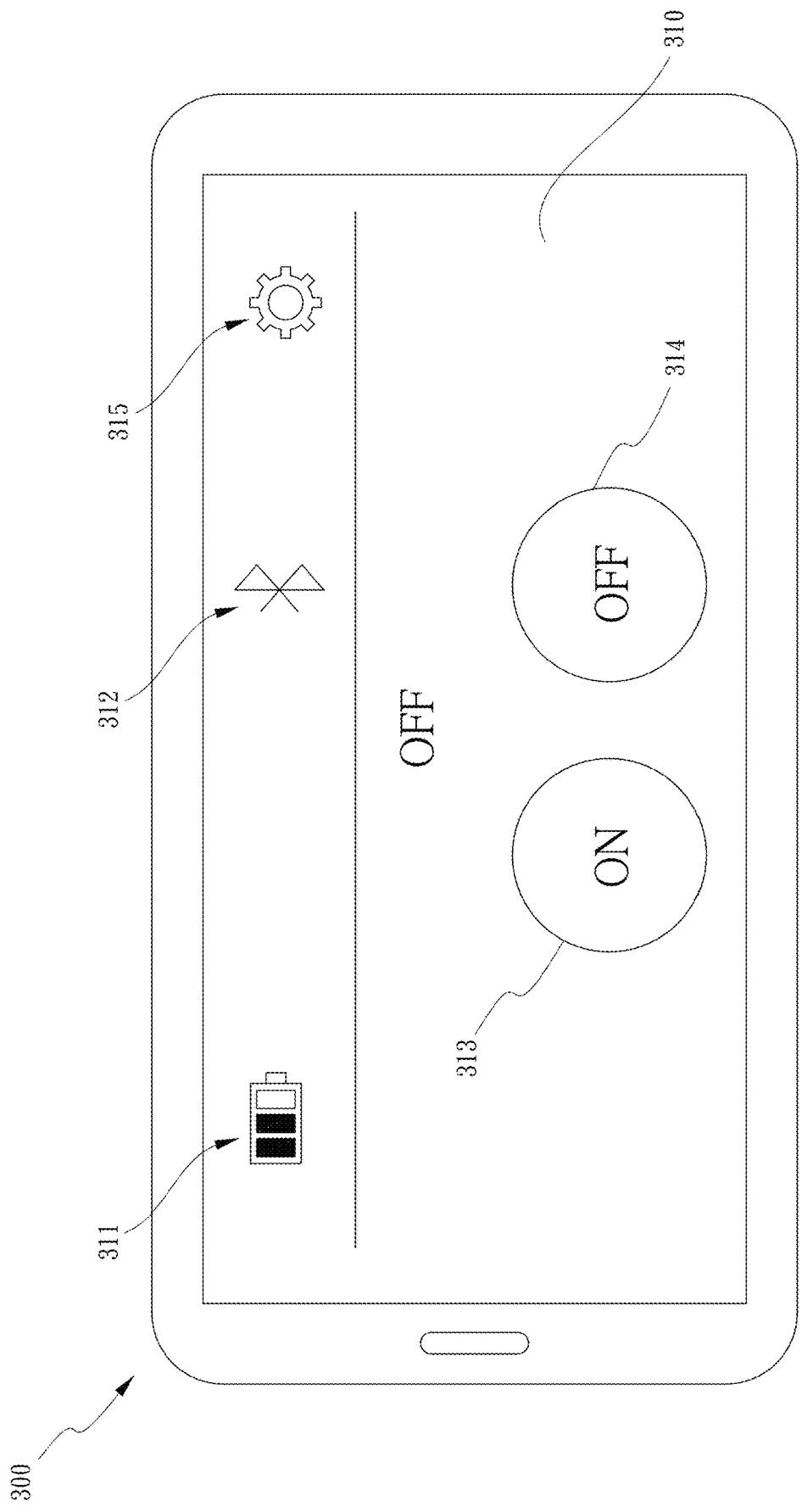
FIG. 5 is a schematic view of displaying the operation interface of the portable device.

Referring to FIG. 5, the portable device 300 (including an operation interface 310, the operation interface 310 includes a battery power status bar 311, a Bluetooth icon 312, an on-alarm icon 313, an off-alarm icon 314, and a setting icon 315. Through the operation interface 310 of the portable device 300, the device can be turned on and off. For example, when the alarm operation is triggered during the on-alarm icon 313 is activated, the alarm unit 103 emits sound for 20 seconds and then pauses for 10 seconds. This cycle will repeat until operating the off-alarm icon 314. The battery power status bar 311 shows the current remaining power of the battery 101. The Bluetooth icon 312 provides on and off operation of the Bluetooth communication of the portable device 300. The setting icon 315 is used to change the connection password between the portable device 300 and the bicycle security alarm device of the present disclosure.

Figure 6:
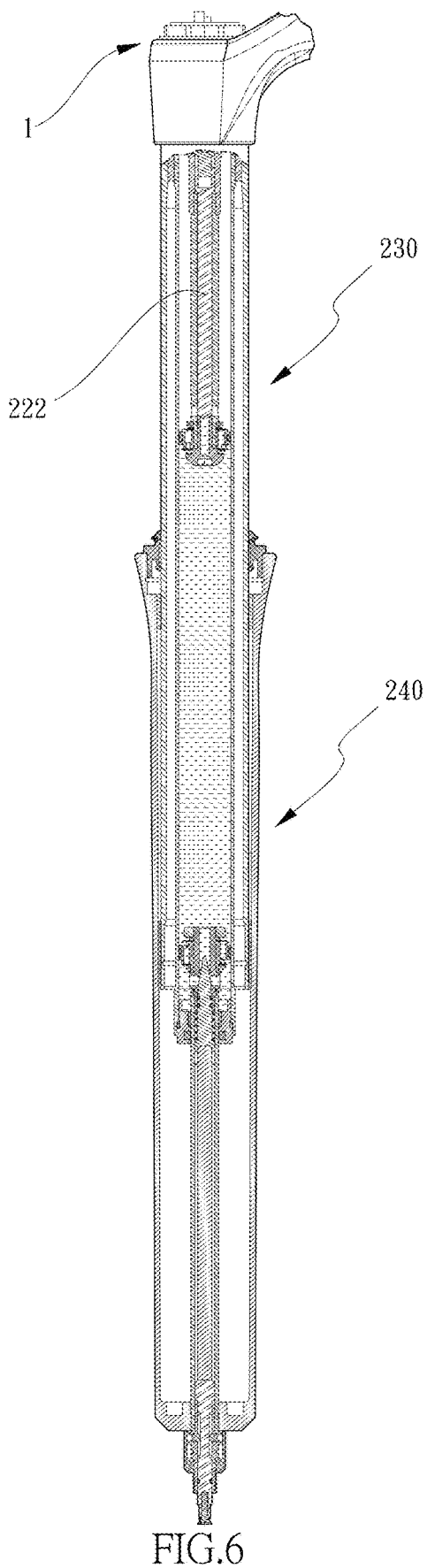
FIG. 6 is a sectional schematic view of VI-VI in FIG. 2, in which the front fork is locked.
Figure 7:
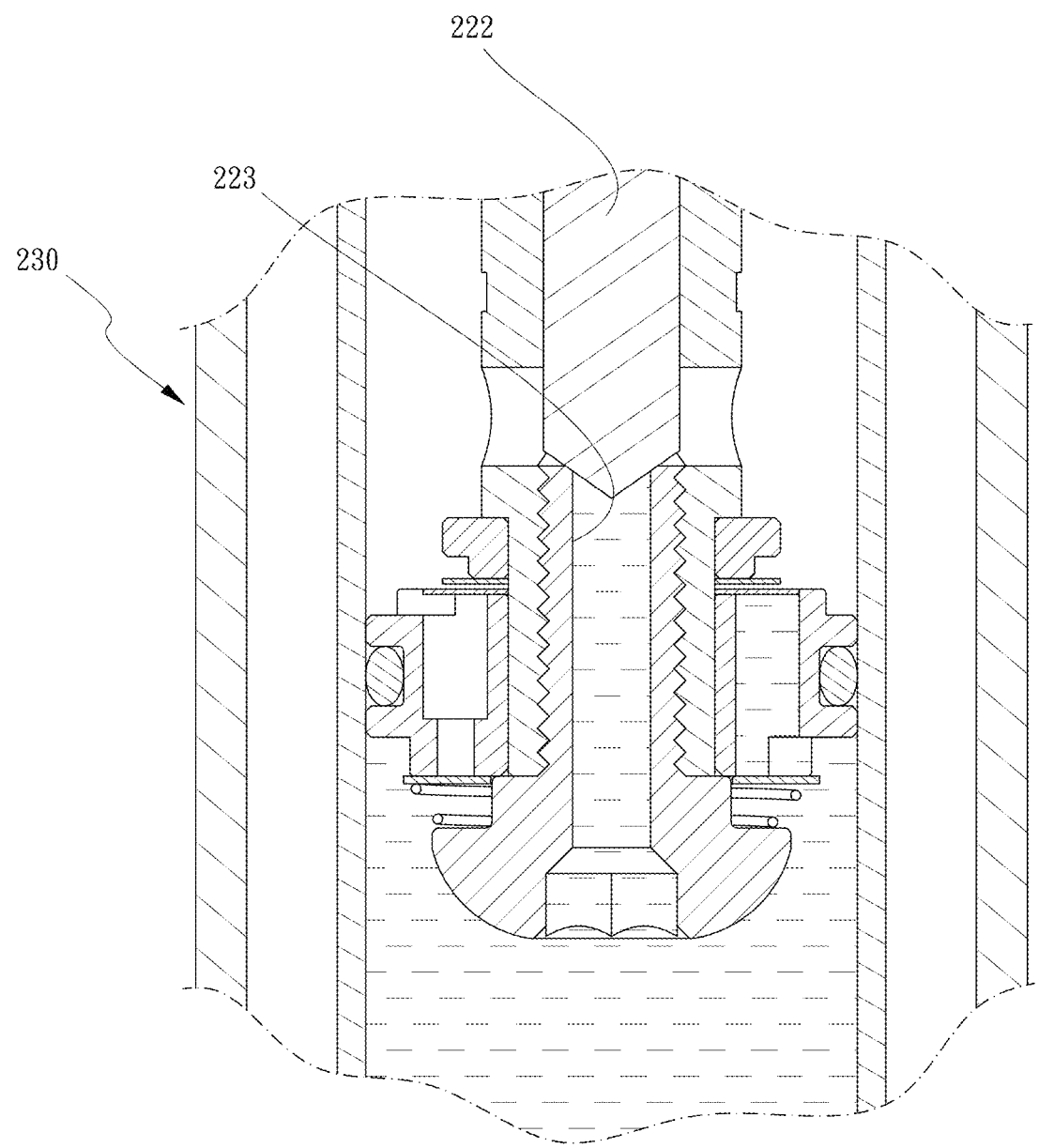
FIG. 7 is a partial enlarged schematic view of in FIG. 6.
Figure 8:
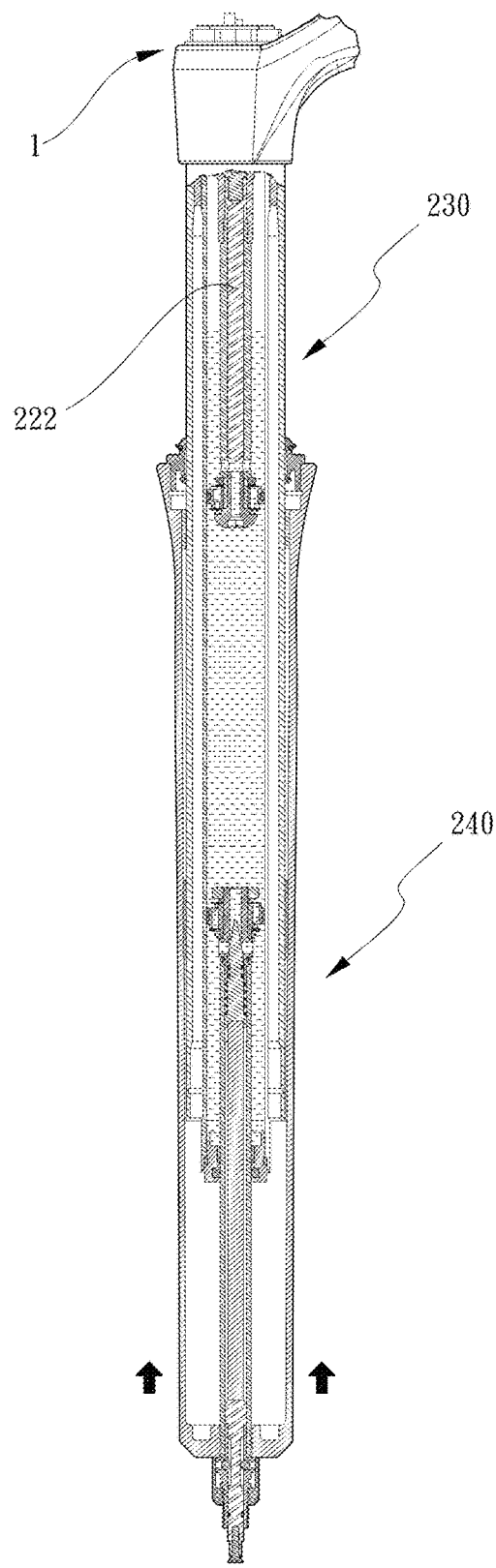
FIG. 8 is a sectional schematic view of the locked front fork being unlocked.
Figure 9:
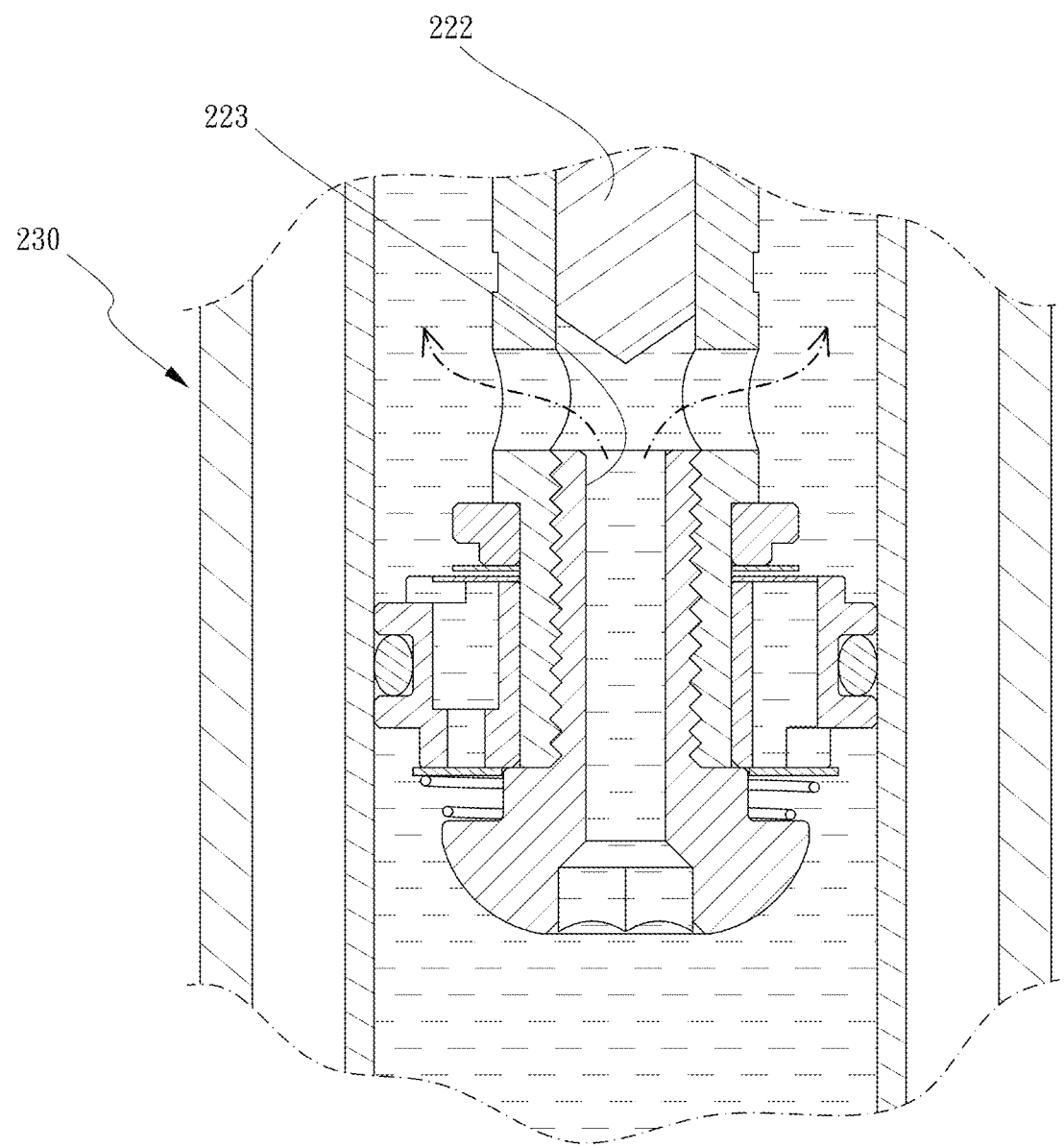
FIG. 9 is a partial enlarged schematic view of in FIG. 8.

The bicycle security alarm device 1 further includes a damping adjusting set 220 electrically connected to the battery 101, the control chip 102 transmits an alarm signal and transmits a damping adjusting signal to the damping adjusting set 220, so that the damping adjusting set 220 adjusts the damping response of the bicycle front fork 200. As disclosed in FIGS. 6-9, the motor 221 of the damping adjusting set 220 operates and indirectly drives the valve stem 222 to move along the axial direction of the front fork, so that the end of the valve stem 222 block the flow channel 223 or release the flow channel 223. The fluid (herein, damping oil as an example) cannot flow and flow smoothly respectively form the locked front fork 200 state (that is, the front fork 200 has no shock-absorbing effect, and the upper tube 230 and the lower tube 240 of the front fork 200 cannot move relative to the axis, as shown in FIG. 6 and FIG. 7) and the unlocked front fork 200 state (which provides a shock-absorbing effect, the upper tube 230 and the lower tube 240 of the front fork 200 can be relatively axially displaced within a limited range, as shown in FIG. 8 and FIG. 9).

For example, when the front fork 200 is unlocked, the front fork 200 is continuously operated to absorb part of the force during pedaling process, which consumes more energy to ride. Or on a non-paved road (gravel road, dirt road, or mixed road with gravel and mud), the locked state of the front fork 200 (cannot provide shock absorbing function, and the top tube 230 and the lower tube 240 of the front fork 200 cannot move relative to the axis), which also makes it difficult to control when riding on rough roads. In other words, through the operation of the damping adjusting set 220, the damping state of the front fork 200 is changed to provide the effort to delay or shorten the distance when the bicycle is stolen, thereby increasing the possibility of retrieving the stolen bike. The damping response of the damping adjustment set 220, is also capable to change by the operation interface 310 of the portable device 300, for example, by the setting icon 315.

What is claimed is:

1. A bicycle security alarm device, comprising a battery, a control chip, an alarm unit and a sensor mounted on a bicycle front fork;
    wherein the battery is electrically connected to the control chip, the alarm unit and the sensor;
    wherein, the control chip is signally connected to the sensor and the alarm unit correspondingly;
    wherein, when the sensor detects a vibration and transmits a detection signal to the control chip, and the control chip transmit an alarm signal to the alarm unit;
    wherein the battery, the control chip and the sensor are mounted on inner side of the bicycle front fork through a cover, and the alarm unit mounted on a hidden case of a head tube of the bicycle front fork.

2. The bicycle security alarm device according to claim 1, further including a switch being electrically connected to the battery.

3. The bicycle security alarm device according to claim 1, further including a charging port being electrically connected to the battery.

4. The bicycle security alarm device according to claim 1, further including a Bluetooth antenna electrically connected to the control chip; wherein, a portable device is connected to the control chip by a duplex wireless signal via the Bluetooth antenna.

5. The bicycle security alarm device according to claim 4, wherein the portable device includes an operation interface havig a battery power status bar, a Bluetooth icon, an on-alarm icon, an off-alarm icon, and a setting icon.

6. The bicycle security alarm device according to claim 1, further including a damping adjusting set electrically connected to the battery, the control chip transmits alarm signal and transmits a damping adjusting signal to the damping adjusting set, so that the damping adjusting set adjusts damping response of the bicycle front fork.

7. The bicycle security alarm device according to claim 1, wherein the cover is equipped with a circuit board for fixing the control chip and the sensor, and the cover is electrically connected to the battery, the alarm unit and the sensor through the circuit hoard.

* * * * *